Figure 1:
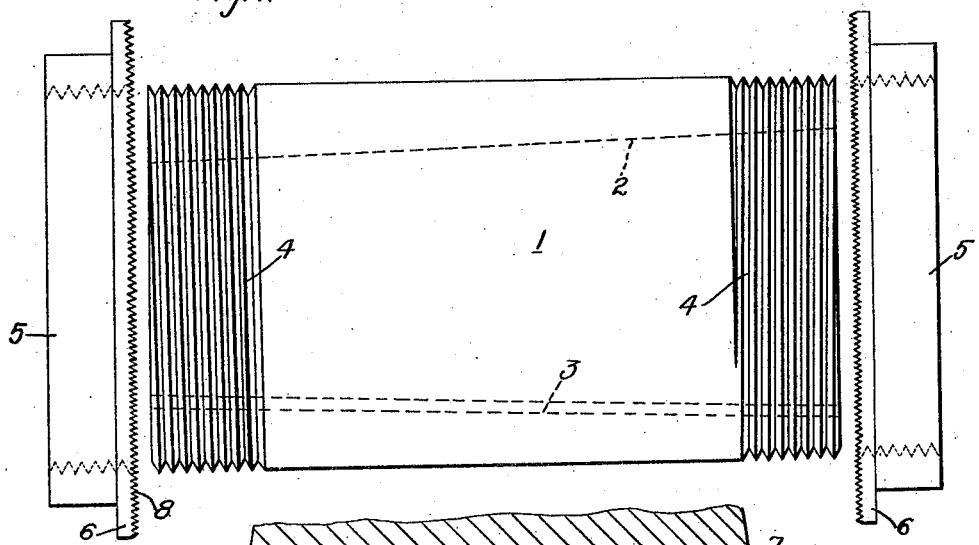

D. A. DICKEY.
SELF TIGHTENING PROPELLER HUB.
APPLICATION FILED JAN. 16, 1919.

1,400,032.

Patented Dec. 13, 1921.

WITNESSES:
J. A. Helsel.
W. H. Woodman.

INVENTOR
Daniel A. Dickey.
BY
Wesley G. Carr
ATTORNEY

UNITED STATES PATENT OFFICE.

DANIEL ADAM DICKEY, OF WILKINSBURG, PENNSYLVANIA, ASSIGNOR TO WESTINGHOUSE ELECTRIC & MANUFACTURING COMPANY, A CORPORATION OF PENNSYLVANIA.

SELF-TIGHTENING PROPELLER-HUB.

1,400,032.  Specification of Letters Patent.  Patented Dec. 13, 1921.

Application filed January 16, 1919. Serial No. 271,538.

*To all whom it may concern:*

Be it known that I, DANIEL A. DICKEY, a citizen of the United States, and a resident of Wilkinsburg, in the county of Allegheny and State of Pennsylvania, have invented a new and useful Improvement in Self-Tightening Propeller-Hubs, of which the following is a specification.

My invention relates to propeller hubs and particularly to hubs for the propellers of aircraft, and it has, for its primary object, the provision of a hub of this character which shall be self-tightening so that a propeller mounted upon it will be securely held against turning about the hub and displacement therefrom.

A still further object of my invention resides in constructing a hub possessing the above advantages which shall be both light and strong and which may be quickly applied to a propeller and from which a propeller may be quickly and easily removed.

Another object of my invention resides in constructing a propeller in such manner that there shall be no necessity for passing bolts or equivalent fastening devices through the hub portion of the propeller, with consequent weakening of the propeller hub.

With these and other objects in view, my invention will be more fully described, illustrated in the drawings, in the several views of which corresponding numerals indicate like parts, and then particularly pointed out in the claims.

Figure 2:
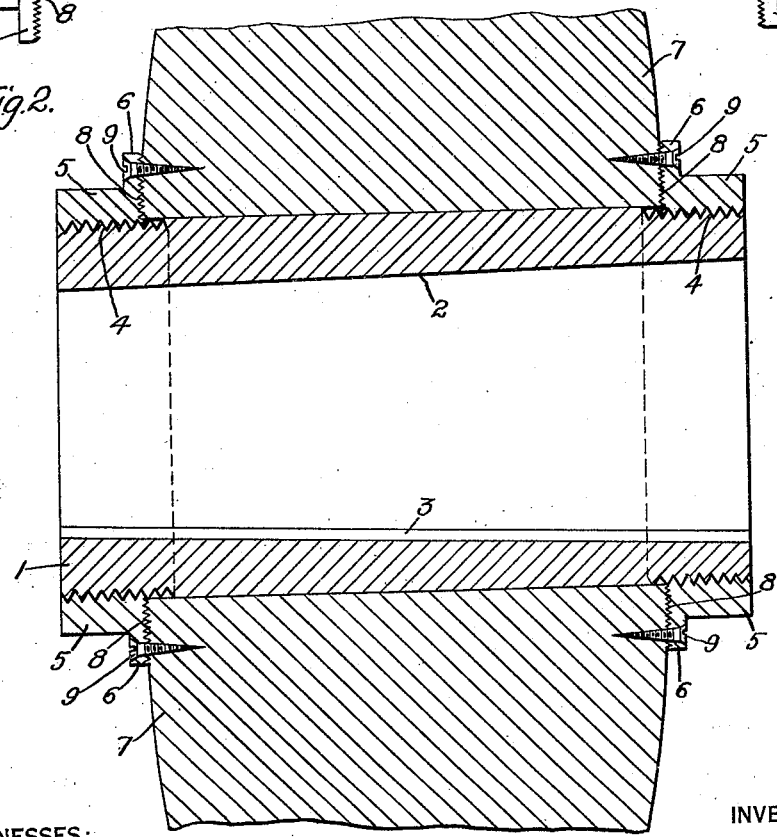

In the drawings, Figure 1 is an elevation of my improved hub, and Fig. 2 is a diametral sectional view taken through the hub and through the hub portion of a propeller mounted thereon.

In practising my invention, I may provide a metal hub in the form of a sleeve or bushing adapted to be keyed upon a propeller-shaft and I may further provide members coöperating with this sleeve or bushing in such manner as to automatically clamp a propeller mounted between them and upon the bushing.

Referring more particularly to the drawings, which disclose one form of my invention, my hub comprises a cylindrical body 1, of any suitable metal, formed with an axial, tapered, propeller-shaft-receiving bore 2 which may be provided with one or more keyways 3. The hub body or bushing has its end portions exteriorly and reversely threaded, as shown at 4, to receive clamping nuts 5. The clamping nuts 5 are preferably provided with annular compression flanges 6 adapted to engage against the faces of a propeller hub 7, in the manner shown in Fig. 2.

When a propeller is mounted upon the hub body, as shown in the drawings, and the clamping nuts 5 are tightened against the hub faces, any tendency for the propeller to turn about the hub is prevented, as the frictional engagement between the nuts and the faces of the propeller-hub will act to cause the nuts to turn toward each other and into firm clamping engagement with the propeller-hub.

While, in most instances, it is not necessary, I may provide the propeller-hub-engaging faces of the nut flanges with roughened surfaces 8, by corrugating, knurling or ribbing them, to increase the frictional engagement and thus to further insure turning of the nuts with the propeller until they are so tightened as to securely lock the propeller to the hub. Pins or small screws 9 may also be passed through the compression flanges of the nuts 5 into the propeller-hub 7 if deemed advisable.

From the foregoing description, it will be apparent that I have provided a propeller-hub which is strong and, at the same time, light in construction. It will further be obvious that the hub will tighten automatically to firmly hold the propeller against any movement about it and against longitudinal displacement. A hub constructed in the manner shown may be quickly applied to a propeller, and a damaged propeller may be quickly and easily removed from the hub without necessitating removal of the hub from the propeller shaft, it being necessary merely to remove the front clamping nut in order to release the propeller.

While the hub is primarily intended for use with composite propellers formed by molding superimposed layers of fibrous sheet material, impregnated with a suitable binder, such as a phenolic condensation product, it will be appreciated that it may be employed with propellers of other materials. In adapting the hub to propellers of other materials, certain modifications may be advisable and it will, therefore, be understood that no limitations are to be imposed upon my invention, other than those indicated in the appended claims.

I claim as my invention:

1. A hub for propellers and the like comprising a cylindrical body formed with a shaft-receiving bore and having its ends exteriorly and reversely threaded, and clamping nuts applicable to the reversely threaded ends of the body.

2. A hub for propellers and the like comprising a cylindrical body formed with a shaft-receiving bore and with reversely threaded end portions, and clamping elements having threaded engagement thereon.

3. A hub for propellers and the like comprising a cylindrical body formed with a shaft-receiving bore and with reversely threaded end portions, and flanged clamping elements having threaded engagement with the end portions.

4. A hub for propellers and the like comprising a cylindrical body formed with a shaft-receiving bore and with reversely threaded end portions, and flanged clamping elements having threaded engagement with the end portions, the opposed faces of the flanged nuts being roughened.

5. A hub comprising a tubular body having reversely threaded end portions, and clamping elements having threaded engagement thereon.

In testimony whereof, I have hereunto subscribed my name this 27th day of Dec., 1918.

DANIEL ADAM DICKEY.